(12) United States Patent
Kang et al.

(10) Patent No.: US 12,000,008 B2
(45) Date of Patent: Jun. 4, 2024

(54) ADVANCED HIGH STRENGTH ZINC PLATED STEEL SHEET HAVING EXCELLENT SURFACE QUALITY AND ELECTRICAL RESISTANCE SPOT WELDABILITY

(71) Applicant: POSCO, Pohang-si (KR)

(72) Inventors: Ki-Cheol Kang, Gwangyang-si (KR); Chung-Hwan Lee, Gwangyang-si (KR); Yong-Joo Kim, Gwangyang-si (KR); Kang-Min Lee, Gwangyang-si (KR); Kyoo-Young Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/787,174

(22) PCT Filed: Dec. 18, 2020

(86) PCT No.: PCT/KR2020/018680
§ 371 (c)(1),
(2) Date: Jun. 17, 2022

(87) PCT Pub. No.: WO2021/125885
PCT Pub. Date: Jun. 24, 2021

(65) Prior Publication Data
US 2023/0024115 A1 Jan. 26, 2023

(30) Foreign Application Priority Data
Dec. 20, 2019 (KR) .......................... 10-2019-0171690

(51) Int. Cl.
*B32B 15/01* (2006.01)
*B32B 15/04* (2006.01)
(Continued)

(52) U.S. Cl.
CPC ............... *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 1/19* (2013.01); *C21D 1/25* (2013.01); *C21D 1/76* (2013.01); *C21D 1/84* (2013.01); *C21D 3/04* (2013.01); *C21D 6/002* (2013.01); *C21D 6/005* (2013.01); *C21D 6/008* (2013.01); *C21D 8/0205* (2013.01);
(Continued)

(58) Field of Classification Search
CPC ........ C21D 6/002; C21D 6/005; C21D 6/008; C21D 3/04; C21D 1/19; C21D 1/25; C21D 1/76; C21D 1/84; C21D 9/46; C21D 9/562; C21D 8/0205; C21D 8/0236; C21D 8/0226; C21D 8/0257; C21D 8/0263; C21D 8/0273; C21D 8/0278; B32B 15/01; B32B 15/013; B32B 15/04; B32B 15/043; B32B 15/18; B32B 2307/732; C22C 38/001; C22C 38/008; C22C 38/06; C22C 38/22; C22C 38/24; C22C 38/26; C22C 38/28; C22C 38/32; C22C 38/34; C22C 38/38; C22C 38/02; C22C 38/04; C22C 38/12; C22C 38/14; C22C 38/18; C22C 38/44; C22C 38/46; C22C 38/48; C22C 38/50; C22C 38/58; C23C 2/02; C23C 2/0224; C23C 2/024; C23C 2/06; C23C 2/28; C23C 2/29; C23C 2/40; C23C 2/022; C23C 30/00; C23C 30/005; C23C 28/025; C23C 28/3225; C23C 28/345; Y10T 428/12583; Y10T 428/1259; Y10T 428/12597; Y10T 428/12611; Y10T 428/12618; Y10T 428/12666; Y10T 428/12667; Y10T 428/12799; Y10T 428/12958; Y10T 428/12965; Y10T 428/12972; Y10T 428/12993; Y10T 428/24942; Y10T 428/24967; Y10T 428/2495; Y10T 428/24983; Y10T 428/26; Y10T 428/27; Y10T 428/273
See application file for complete search history.

(56) References Cited

U.S. PATENT DOCUMENTS

| | | | |
|---|---|---|---|
| 5,019,460 A | 5/1991 | Yasuda et al. | |
| 2008/0075971 A1 | 3/2008 | Sun | |

(Continued)

FOREIGN PATENT DOCUMENTS

| | | |
|---|---|---|
| CA | 2006756 C | 6/1994 |
| CN | 103154297 A | 6/2013 |

(Continued)

OTHER PUBLICATIONS

Extended European Search Report dated Sep. 7, 2022 issued in European Patent Application No. 20901647.6.
(Continued)

*Primary Examiner* — Michael E. La Villa
(74) *Attorney, Agent, or Firm* — Morgan, Lewis & Bockius LLP

(57) ABSTRACT

The present disclosure relates to a high-strength hot-dip galvanized steel sheet having excellent surface quality and electrical resistance spot weldability, and a method for manufacturing the same. A galvanized steel sheet according to an aspect of the present disclosure is a galvanized steel sheet including a base steel sheet and a zinc-based plating layer formed on a surface of the base steel sheet, wherein a ratio (a/b) of a hardness of a surface layer portion (a) to a hardness of an internal portion (b) of the base steel sheet may be less than 0.95.

8 Claims, 1 Drawing Sheet

(51) Int. Cl.
| | |
|---|---|
| *B32B 15/18* | (2006.01) |
| *C21D 1/19* | (2006.01) |
| *C21D 1/25* | (2006.01) |
| *C21D 1/76* | (2006.01) |
| *C21D 1/84* | (2006.01) |
| *C21D 3/04* | (2006.01) |
| *C21D 6/00* | (2006.01) |
| *C21D 8/02* | (2006.01) |
| *C21D 9/46* | (2006.01) |
| *C21D 9/56* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/18* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *C23C 2/02* | (2006.01) |
| *C23C 2/06* | (2006.01) |
| *C23C 2/28* | (2006.01) |
| *C23C 2/40* | (2006.01) |
| *C23C 28/00* | (2006.01) |
| *C23C 28/02* | (2006.01) |
| *C23C 30/00* | (2006.01) |

(52) U.S. Cl.
CPC ......... *C21D 8/0226* (2013.01); *C21D 8/0236* (2013.01); *C21D 8/0257* (2013.01); *C21D 8/0263* (2013.01); *C21D 8/0273* (2013.01); *C21D 8/0278* (2013.01); *C21D 9/562* (2013.01); *C22C 38/001* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/44* (2013.01); *C22C 38/46* (2013.01); *C22C 38/48* (2013.01); *C22C 38/50* (2013.01); *C22C 38/58* (2013.01); *C23C 2/02* (2013.01); *C23C 2/022* (2022.08); *C23C 2/0224* (2022.08); *C23C 2/024* (2022.08); *C23C 2/06* (2013.01); *C23C 2/28* (2013.01); *C23C 2/29* (2022.08); *C23C 2/40* (2013.01); *C23C 28/025* (2013.01); *C23C 28/3225* (2013.01); *C23C 28/345* (2013.01); *C23C 30/00* (2013.01); *C23C 30/005* (2013.01); *B32B 2307/732* (2013.01); *Y10T 428/12583* (2015.01); *Y10T 428/1259* (2015.01); *Y10T 428/12597* (2015.01); *Y10T 428/12611* (2015.01); *Y10T 428/12618* (2015.01); *Y10T 428/1266* (2015.01); *Y10T 428/12667* (2015.01); *Y10T 428/12799* (2015.01); *Y10T 428/12958* (2015.01); *Y10T 428/12965* (2015.01); *Y10T 428/12972* (2015.01); *Y10T 428/12993* (2015.01); *Y10T 428/24942* (2015.01); *Y10T 428/2495* (2015.01); *Y10T 428/24967* (2015.01); *Y10T 428/24983* (2015.01); *Y10T 428/26* (2015.01); *Y10T 428/27* (2015.01); *Y10T 428/273* (2015.01)

(56) References Cited

U.S. PATENT DOCUMENTS

| | | | |
|---|---|---|---|
| 2013/0327452 | A1 | 12/2013 | Fushiwaki et al. |
| 2016/0319385 | A1 | 11/2016 | Hasegawa et al. |
| 2017/0037488 | A1 | 2/2017 | Hasegawa et al. |
| 2017/0088914 | A1 | 3/2017 | Ikeda et al. |
| 2017/0211164 | A1 | 7/2017 | Kimura et al. |
| 2018/0371570 | A1 | 12/2018 | Kim et al. |
| 2020/0010919 | A1 | 1/2020 | Suzuki et al. |
| 2020/0325568 | A1 | 10/2020 | Jin et al. |
| 2020/0332379 | A1 | 10/2020 | Friedel et al. |

FOREIGN PATENT DOCUMENTS

| | | | | |
|---|---|---|---|---|
| CN | 105814227 | A | 7/2016 | |
| CN | 105829563 | A | 8/2016 | |
| CN | 106133164 | A | 11/2016 | |
| CN | 106574337 | A | 4/2017 | |
| CN | 108431273 | A | 8/2018 | |
| CN | 110177894 | A | 8/2019 | |
| EP | 2128295 | A1 * | 12/2009 | ............... C21D 9/46 |
| EP | 3054025 | A1 | 8/2016 | |
| EP | 3085802 | A1 | 10/2016 | |
| JP | S61-279311 | A | 12/1986 | |
| JP | S62-63687 | A | 3/1987 | |
| JP | 2610948 | B2 | 5/1997 | |
| JP | 2005-105361 | A | 4/2005 | |
| JP | 2005-256044 | A | 9/2005 | |
| JP | 2007-211279 | A | 8/2007 | |
| JP | 2013-044022 | A | 3/2013 | |
| JP | 2014-009399 | A | 1/2014 | |
| JP | 2014-122379 | A | 7/2014 | |
| JP | 2017-002384 | A | 1/2017 | |
| JP | 2017-008367 | A | 1/2017 | |
| JP | 2019-521257 | A | 7/2019 | |
| JP | 2019-532172 | A | 11/2019 | |
| KR | 10-2016-0101095 | A | 8/2016 | |
| KR | 10-2019-0078437 | A | 7/2019 | |
| WO | 2017/145329 | A1 | 8/2017 | |
| WO | 2018/151322 | A1 | 8/2018 | |
| WO | 2019/132288 | A1 | 7/2019 | |

OTHER PUBLICATIONS

International Search Report dated Mar. 5, 2021 issued in International Patent Application No. PCT/KR2020/018680 (with English translation).

Chinese Office Action dated Mar. 23, 2023, issued in corresponding Chinese Patent Application No. 202080088990.2.

Chinese Office Action dated Jan. 26, 2024 issued in Chinese Patent Application No. 202080088990.2.

G. Yang, "Shape control and detection for hot-rolled strip," Metallurgical Industry Press, Jul. 31, 2015 (with English Extract).

* cited by examiner

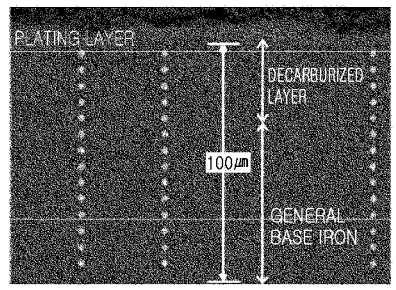
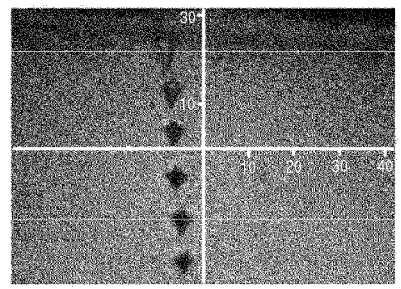

ADVANCED HIGH STRENGTH ZINC PLATED STEEL SHEET HAVING EXCELLENT SURFACE QUALITY AND ELECTRICAL RESISTANCE SPOT WELDABILITY

CROSS-REFERENCE OF RELATED APPLICATIONS

This application is the U.S. National Phase under 35 U.S.C. § 371 of International Patent Application No. PCT/KR2020/018680, filed on Dec. 18, 2020, which in turn claims the benefit of Korean Application No. 10-2019-0171690, filed on Dec. 20, 2019, the entire disclosures of which applications are incorporated by reference herein.

TECHNICAL FIELD

The present disclosure relates to a high-strength hot-dip galvanized steel sheet having excellent surface quality and electrical resistance spot weldability, and a method for manufacturing the same.

BACKGROUND ART

Regulations on vehicle emissions and fuel economy have been strengthened due to problems such as environmental pollution. Accordingly, there has been a strong demand for reduction in fuel consumption by reducing a weight of a steel sheet for a vehicle. Therefore, various types of high-strength steel sheets having high strength per unit thickness have been developed and released.

High-strength steel generally refers to steel having a strength of 490 MPa or more, but is not necessarily limited thereto. High-strength steel may include transformation induced plasticity (TRIP) steel, twin induced plasticity (TWIP) steel, dual phase (DP) steel, complex phase (CP) steel, and the like.

Meanwhile, steel materials for a vehicle are supplied in a form of a plated steel sheet having a surface subjected to plating to ensure corrosion resistance, and thereamong, a galvanized steel sheet (GI steel sheet) or a galvannealed steel sheet (GA) is often used as a material for a vehicle because these steel sheets have high corrosion resistance utilizing sacrificial protection properties of zinc.

However, in a case in which a surface of the high-strength steel sheet is plated with zinc, spot weldability is deteriorated, which is problematic. That is, in the case of the high-strength steel, since yield strength is high as well as tensile strength, it is difficult to remove tensile stress generated during welding through plastic deformation, such that it is highly likely that microcracking is will be generated in the surface. When welding is performed on a high-strength galvanized steel sheet, zinc having a low melting point may permeate into the microcracking of the steel sheet. As a result, a phenomenon called liquid metal embrittlement (LME) may occur, such that the steel sheet may fracture in a fatigue environment, which is a major obstacle to increasing strength of the steel sheet.

Furthermore, alloying elements such as Si, Al, Mn etc. that are contained in the high-strength steel sheet in a large amount diffuse to a surface of the steel sheet during a manufacturing process to form oxides on the surface. As a result, wettability of zinc is significantly reduced, which may cause deterioration of surface quality such as non-plating.

DISCLOSURE

Technical Problem

According to an aspect of the present disclosure, there are provided a hot-dip galvanized steel sheet having excellent surface quality and spot weldability, and a method for manufacturing the same.

An object of the present disclosure is not limited to the above description. Those skilled in the art to which the present disclosure pertains will have no difficulties in understanding additional objects of the present disclosure from the overall description in the specification of the present disclosure.

Technical Solution

A galvanized steel sheet according to an aspect of the present disclosure is a galvanized steel sheet including a base steel sheet and a zinc-based plating layer formed on a surface of the base steel sheet, wherein a ratio (a/b) of a hardness of a surface layer portion (a) to a hardness of an internal portion (b) of the base steel sheet may be less than 0.95.

A method for manufacturing a galvanized steel sheet according to another aspect of the present disclosure may include: heating a steel slab to a temperature of 950 to 1,350° C.; hot-rolling the steel slab under conditions of a finishing rolling start temperature of 900 to 1,150° C. and a finishing rolling end temperature of 850 to 1,050° C. to obtain a hot-rolled steel sheet; coiling the hot-rolled steel sheet at a temperature of 590 to 750° C.; pickling the hot-rolled steel sheet at a sheet-passing speed of 180 to 250 mpm; cold-rolling the hot-rolled steel sheet at a reduction ratio of 35 to 60% to obtain a cold-rolled steel sheet; performing recrystallization annealing on the cold-rolled steel sheet in an atmosphere of a dew point of −10 to 30° C. at 650 to 900° C.; and hot-dip galvanizing the annealed cold-rolled steel sheet.

Advantageous Effects

As set forth above, in an exemplary embodiment in the present disclosure, the hardness of the surface layer portion of the steel sheet is controlled to a value lower than the hardness of the internal portion, such that possibility of generation of cracking may be reduced even when tensile stress is applied during spot welding, and thus, the liquid metal embrittlement (LME) phenomenon caused by penetration of a hot-dip galvanized layer along cracking may be significantly reduced. In addition, in an exemplary embodiment in the present disclosure, formation of oxides on the surface of the steel sheet may be reduced, such that the effect of suppressing deterioration of the plating quality may be obtained.

DESCRIPTION OF DRAWINGS

FIG. 1 is a photograph of a cross section of a steel sheet specimen in which a hardness of each of a surface layer portion and an internal region is measured.

BEST MODE FOR INVENTION

Hereinafter, the present disclosure will be described in detail with reference to several exemplary embodiments.

It should be noted that the term "galvanized steel sheet" in the present disclosure is the concept including a galvanized steel sheet (GI steel sheet), a galvannealed steel sheet (GA), and a plated steel sheet in which a zinc-based plating layer mainly containing zinc is formed. The phrase of "mainly containing zinc" means that a ratio of zinc is the highest among elements contained in the plating layer. However, in the galvannealed steel sheet, a ratio of iron may be higher than that of zinc, and even a steel sheet having the highest ratio of zinc among the remaining components other than iron may be included in the scope of the present disclosure.

The inventors of the present disclosure have focused on the fact that the cause of liquid metal embrittlement (LME) occurring during welding is microcracking generated from a surface of a steel sheet, have conducted studies on means for suppressing generation of microcracking in the surface, and then have found that it is required to soften the surface of the steel sheet to this end, thereby completing the present disclosure.

In general, high-strength steel may contain elements such as carbon (C), manganese (Mn), and silicon (Si) in a large amount to secure hardenability, austenite stability, and the like of the steel, and these elements cause increase of sensitivity to cracking of the steel. Therefore, microcracking is easily generated in the steel containing a large amount of these elements, which ultimately causes liquid metal embrittlement during welding.

According to the results of studies conducted by the present inventors, the reason that the microcracking is easily generated is that a hardness of the steel sheet is generally proportional to a strength and a steel sheet having a high hardness has high sensitivity to cracking. Therefore, the present inventors have found that the sensitivity to cracking may be reduced by lowering only a hardness of a surface layer portion in which cracking is generated and propagate while maintaining the entire hardness at a high level in order to secure strength of the steel sheet, thereby completing the present disclosure.

Therefore, according to an exemplary embodiment in the present disclosure, as a galvanized steel sheet including a base steel sheet and a zinc-based plating layer formed on a surface of the base steel sheet, a hot-dip galvanized steel sheet in which a ratio (a/b) of a hardness of a surface layer portion (a) to a hardness of an internal portion (b) is controlled to less than 0.95 may be provided. Here, the surface layer portion refers to a region from the surface of the steel sheet to a depth of 20 μm, and the internal portion refers to a region having a depth of 30 to 100 μm. The hardness of each region may be an average value of values measured at equal intervals in a depth direction. In an exemplary embodiment in the present disclosure, in the ratio (a/b) of the hardness of the surface layer portion (a) to the hardness of the internal portion (b) of the steel sheet, a nano-indentation Vickers hardness of a region from the surface to a depth of 5 to 100 μm is measured by applying a load of 5 g at intervals of 5 μm, and an average value of measured hardness values at points corresponding to the depths of the surface layer portion and the internal region may be used as a hardness value of the corresponding region.

In this case, even in a case of a steel material having a high strength, possibility of generation of cracking due to stress acting on the surface may be significantly reduced. According to an exemplary embodiment in the present disclosure, the ratio (a/b) may be less than 0.90, in another exemplary embodiment in the present disclosure, the ratio (a/b) may be less than 0.85, and in still another exemplary embodiment in the present disclosure, the ratio (a/b) may be less than 0.80.

Since it is more advantageous as the hardness of the surface layer portion is low, a lower limit of the ratio (a/b) of the hardness of the surface layer portion (a) to the hardness of the internal portion (b) is not particularly limited. However, in consideration of a common method capable of efficiently reducing the hardness of the surface layer portion without significantly affecting the strength of the steel sheet, the ratio (a/b) may be set to 0.2 or more.

The ratio (a/b) of the hardness of the surface layer portion to the hardness of the internal portion may be a value measured in an arbitrary position in a width direction of the steel sheet, and for example, may be based on a value measured at the central portion in the width direction. However, according to an exemplary embodiment in the present disclosure, the hardness of the surface layer portion has a higher value at an edge portion in the width direction, and thus, the ratio (a/b) may have a high value. Therefore, the ratio (a/b) may be based on a value measured at the edge portion in the width direction. In this case, the edge portion refers to both ends of the steel sheet, but in a case in which there is a problem with integrity of a specimen, such as occurrence of contamination at the point, the edge portion may refer to a point located 1 mm inside from the end in the width direction.

The type of steel sheet targeted in the present disclosure is not limited as long as it is a high-strength steel sheet having a strength of 490 MPa or more. However, the steel sheet targeted in the present disclosure may have, but is not necessarily limited to, a composition containing, by weight ratio, 0.05 to 1.5% of C, 2.0% or less of Si, 1.0 to 30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N. The remaining components are iron and other impurities, and further inclusion of other elements that are not listed above and may be contained in the steel in a range of 1.0% or less in total is not be excluded. In the present disclosure, the content of each element is represented based on weight unless otherwise indicated. The composition refers to a bulk composition of the steel sheet, that is, a composition at a point of ¼ of the thickness of the steel sheet (the same applies in the following).

In several exemplary embodiments in the present disclosure, TRIP steel and the like may be used as the high-strength steel sheet. These steels may have the following composition when being classified in detail.

Steel composition 1: Containing 0.05 to 0.30% (preferably 0.10 to 0.25%) of C, 0.5 to 2.5% (preferably 1.0 to 1.8%) of Si, 1.5 to 4.0% (preferably 2.0 to 3.0%) of Mn, 1.0% or less (preferably 0.05% or less) of S—Al, 2.0% or less (preferably 1.0% or less) of Cr, 0.2% or less (preferably 0.1% or less) of Mo, 0.005% or less (preferably 0.004% or less) of B, 0.1% or less (preferably 0.05% or less) of Nb, 0.1% or less (preferably 0.001 to 0.05%) of Ti, 0.05% or less of Sb+Sn+Bi, 0.01% or less of N, and a balance of Fe and inevitable impurities. In some cases, elements that are not listed above but may be contained in the steel may be further contained in a range of 1.0% or less in total.

Steel composition 2: Containing 0.05 to 0.30% (preferably 0.10 to 0.2%) of C, 0.5% or less (preferably 0.3% or less) of Si, 4.0 to 10.0% (preferably 5.0 to 9.0%) of Mn, 0.05% or less (preferably 0.001 to 0.04%) of S—Al, 2.0% or less (preferably 1.0% or less) of Cr, 0.5% or less (preferably 0.1 to 0.35%) of Mo, 0.005% or less (preferably 0.004% or less) of B, 0.1% or less (preferably 0.05% or less) of Nb, 0.15% or less (preferably 0.001 to 0.1%) of Ti, 0.05% or less of Sb+Sn+Bi, 0.01% or less of N, and a balance of Fe and inevitable impurities. In some cases, elements that are not listed above but may be contained in the steel may be further contained in a range of 1.0% or less in total.

In addition, among the above-described respective elements, an element of which a lower limit of a content is not limited may be regarded as an optional element, and the content thereof may also be 0%.

Although not necessarily limited thereto, a thickness of the base steel sheet according to an exemplary embodiment in the present disclosure may be 1.0 to 2.0 mm.

In addition, the plated steel sheet according to an exemplary embodiment in the present disclosure contains internal oxides containing at least one of Si, Mn, Al, and Fe that are present in the surface layer portion of the base steel sheet, such that the steel sheet may have improved surface quality. That is, the oxides are present inside the surface layer portion, such that formation of oxides on the surface of the steel sheet may be suppressed. As a result, wettability between the base steel sheet and a plating solution is secured during plating, and excellent plating performance may be obtained.

According to an exemplary embodiment in the present disclosure, one or more plating layers may be included in the surface of the steel sheet, and the plating layer may be a zinc-based plating layer including a galvanized (GI) layer, a galvannealed (GA) layer, or the like. In the present disclosure, the ratio of the hardness of the surface layer portion to the hardness of the internal portion is controlled in an appropriate range as described above, such that even when a zinc-based plating layer is formed on the surface of the steel sheet, liquid metal embrittlement occurring during spot welding may be suppressed.

According to an exemplary embodiment in the present disclosure, in a case in which the zinc-based plating layer is a GA layer, a degree of alloying (refers to a content of Fe in the plating layer) may be controlled to 8 to 13 wt %, and preferably 10 to 12 wt %. In a case in which the degree of alloying is insufficient, the possibility of liquid metal embrittlement caused by zinc in the zinc-based plating layer permeating into microcracking may remain. On the contrary, in a case in which the degree of alloying is too high, problems such as powdering may occur.

In addition, a coating weight of the zinc-based plating layer may be 30 to 70 g/m². When the coating weight is too small, it may be difficult to obtain sufficient corrosion resistance, and on the contrary, when the coating weight is too large, problems such as an increase in manufacturing costs and liquid metal embrittlement may occur. Thus, the coating weight is controlled within the above range. A more preferred range of the coating weight may be 40 to 60 g/m². The coating weight refers to the amount of plating layer coated on a final product. In a case in which the plating layer is a GA layer, a weight thereof may be slightly decreased before alloying because the coating weight is increased due to alloying, and since the coating weight varies depending on the degree of alloying, the coating amount (that is, the amount of plating from a plating bath) before alloying may be, but is not necessarily limited to, a value decreased by about 10%.

Hereinafter, an exemplary embodiment of manufacturing a steel sheet of the present disclosure will be described. However, the steel sheet of the present disclosure may not necessarily be manufactured according to the following exemplary embodiment. It should be noted that the following exemplary embodiment is one preferred method for manufacturing the steel sheet of the present disclosure.

First, a hot-rolled steel sheet may be manufactured by re-heating the steel slab having the composition described above, and performing a process of performing hot-rolling through rough milling and finishing rolling, hot-rolling, run-out-table (ROT) cooling, and then coiling. Thereafter, the manufactured steel sheet may be subjected to pickling and then cold-rolling, and the obtained cold-rolled steel sheet may be annealed and plated. Conditions of the hot-rolling such as ROT cooling are not particularly limited, but in an exemplary embodiment in the present disclosure, a slab heating temperature, finishing rolling start and end temperatures, a coiling temperature, edge portion heating conditions of a coiled coil, pickling conditions, cold-rolling conditions, annealing conditions, plating conditions, and the like may be limited as follows.

Slab heating temperature: 950 to 1,300° C.

The slab heating is performed to secure rolling properties by heating a material before hot-rolling. During re-heating of the slab, a surface layer portion of the slab also combines with oxygen in a furnace to form oxide scale. When scale is formed, the surface layer portion reacts with carbon in the steel to cause a decarburization reaction forming carbon monoxide gas, and the amount of decarburization is increased as a slab re-heating temperature is higher. When the slab re-heating temperature is excessively high, a decarburized layer is excessively formed, resulting in softening of a material of a final product, and when the slab re-heating temperature is excessively low, hot-rolling properties may not be secured and edge cracking may thus be generated, and the hardness of the surface layer portion may not be sufficiently lowered, resulting in insufficient suppression of LME.

Finishing rolling start temperature: 900 to 1,150° C.

When the finishing rolling start temperature is excessively high, hot-rolling scale is excessively formed on the surface, and thus, the amount of surface defects caused by the scale of a final product may be increased. Therefore, an upper limit of the finishing rolling start temperature is limited to 1,150° C. In addition, when the finishing rolling start temperature is lower than 900° C., stiffness of the bar is increased due to the decrease in temperature, and thus, the hot-rolling properties may be significantly reduced. Therefore, the finishing rolling start temperature may be limited in the above range.

Finishing rolling end temperature: 850 to 1,050° C.

When the finishing rolling end temperature exceeds 1,050° C., scale removed by descaling in the finishing rolling is excessively formed on the surface again, and thus, the amount of surface defects is increased. When the finishing rolling end temperature is lower than 850° C., the hot-rolling properties are deteriorated. Therefore, the finishing rolling end temperature may be limited in the above range.

Coiling temperature: 590 to 750° C.

The hot-rolled steel sheet is then coiled and stored in a coil form, and the coiled steel sheet is subjected to a slow-cooling process. Hardening elements contained in the surface layer portion of the steel sheet are removed by such a process. When the coiling temperature of the hot-rolled steel sheet is too low, the coil is slowly cooled at a temperature lower than a temperature required for oxidation removal of these elements, and thus, it is difficult to obtain sufficient effects.

Heating of edge portion of hot-rolled coil: Performed at 600 to 800° C. for 5 to 24 hours In an exemplary embodiment in the present disclosure, the edge portion of the hot-rolled coil may be heated in order to control a value of a ratio (a/b) of a hardness of a surface portion layer (a) to a hardness of an internal portion (b) of the edge portion. The heating of the edge portion of the hot-rolled coil refers to heating both ends of the coiled coil in the width direction, that is, the edge portions, and the edge portion may be preferentially heated to a temperature suitable for oxidation by heating the edge portion. That is, in an exemplary embodiment in the present disclosure, the hardness of the surface layer portion may be reduced by removing carbon or other solid-dissolved hardening elements (Si, Mn, and Al) in the surface layer portion of the steel sheet, and such a process may be performed by internal oxidation of the surface of the steel sheet. However, in the coiled coil, while the internal portion is maintained at a high temperature, the edge portion is cooled relatively quickly, such that the time when the temperature is maintained at a temperature suitable for internal oxidation may be further shortened at the edge portion. Therefore, decarburization or removal of hardening elements at the edge portion may not be active as compared to the central portion in the width direction. The heating of the edge portion may be used as one method for removing the hardening elements at the edge portion.

That is, in a case in which the edge portion is heated, the edge portion is preferentially heated, unlike the case of performing cooling after coiling, and accordingly, the temperature of the edge portion in the width direction is maintained to be suitable for internal oxidation. As a result, a thickness of an internal oxide layer of the edge portion is increased. To this end, the heating temperature of the edge portion needs to be 600° C. or higher (based on the temperature of the edge portion of the steel sheet). However, when the temperature is too high, scale may be excessively formed at the edge portion during heating or porous high-oxidized scale (hematite) may be formed, such that the surface state after pickling may be deteriorated. Therefore, the temperature of the edge portion may be 800° C. or lower. A more preferred heating temperature of the edge portion is 600 to 750° C.

In addition, in order to solve non-uniformity of a ferrite fraction in a region within 20 μm from the surface of the steel sheet between the edge portion and the central portion in the width direction during the coiling, the heating time of the edge portion needs to be 5 hours or longer. However, when the heating time of the edge portion is too long, scale may be excessively formed, or the hardness of the internal portion may also be reduced. Therefore, the heating time of the edge portion may be 24 hours or less.

According to an exemplary embodiment in the present disclosure, the heating of the edge portion may be performed by a combustion heating method by adjusting an air-fuel ratio. That is, an oxygen fraction in the atmosphere may be changed by adjusting the air-fuel ratio. As an oxygen partial pressure is higher, a concentration of oxygen in contact with the surface layer portion of the steel sheet is more increased, such that decarburization or internal oxidation may be increased. Although not necessarily limited thereto, in an exemplary embodiment in the present disclosure, the atmosphere may be controlled to a nitrogen atmosphere containing 1 to 2% of oxygen by adjusting the air-fuel ratio. Those skilled in the art to which the present disclosure pertains may control the oxygen fraction by adjusting the air-fuel ratio without any particular difficulty, and thus, the description thereof will not be provided.

Pickling treatment: Performed at sheet-passing speed of 180 to 250 mpm

In order to remove hot-rolled scale, the hot-rolled steel sheet subjected to the above-described process is put into a hydrochloric acid bath to perform a pickling treatment. The pickling is performed at a concentration of the hydrochloric acid in the hydrochloric acid bath of 10 to 30% and a sheet-passing speed of 180 to 250 mpm. When the pickling speed exceeds 250 mpm, the surface scale of the hot-rolled steel sheet may not be completely removed. In addition, the pickling is performed at 180 mpm or higher since a base iron surface layer portion may be corroded by hydrochloric acid when the pickling speed is lower than 180 mpm. Therefore, the pickling is performed at 180 mpm or higher.

Cold-rolling: Reduction ratio of 35 to 60%

After performing the pickling, a cold-rolling is performed. The cold-rolling is performed at a cold rolling reduction ratio of 35 to 60%. When the cold rolling reduction ratio is less than 35%, there is no particular problem, but it may be difficult to sufficiently control a microstructure due to insufficient recrystallization driving force during annealing. When the cold rolling reduction ratio exceeds 60%, a thickness of a soft layer secured in the hot-rolling is decreased, and thus, it is difficult to sufficiently decrease a hardness in the region within 20 μm from the surface of the steel sheet after annealing.

After the cold-rolling process, a process of performing annealing on the steel sheet may be followed. Since the hardness in the region (surface layer portion) within 20 μm from the surface of the steel sheet may vary even during the annealing process of the steel sheet, in an exemplary embodiment in the present disclosure, the annealing process may be controlled under conditions for appropriately controlling the hardness in the region within 20 μm from the surface of the steel sheet, and in particular, a sheet-passing speed and a dew point in an annealing furnace may be controlled under the following conditions.

Sheet-passing speed: 40 to 130 mpm

In order to secure sufficient productivity, a sheet-passing speed of the cold-rolled steel sheet needs to be 40 mpm or higher. However, when the sheet-passing speed is excessively fast, it may be disadvantageous in terms of securing a material property. Therefore, in an exemplary embodiment in the present disclosure, an upper limit of the sheet-passing speed may be set to 130 mpm.

Control of dew point in annealing furnace: Control in range of −10 to 30° C. at 650 to 900° C.

It is advantageous to control the dew point in the annealing furnace in order to obtain a hardness value of the surface layer portion in an appropriate range. When the dew point is too low, surface oxidation rather than internal oxidation occurs, which may cause generation of oxides such as Si and Mn on the surface. These oxides adversely affect plating. Therefore, the dew point needs to be controlled to −10° C. or higher. On the contrary, the dew point is too high, oxidation of Fe may occur, and thus, the dew point needs to be controlled to 30° C. or lower. As such, a temperature for controlling the dew point may be 650° C. or higher, which is a temperature at which a sufficient internal oxidation effect is exhibited. However, when the temperature is too high, diffusion of oxygen to the inside is inhibited due to generation of oxides of Si etc. on the surface, and a carbon diffusion rate is reduced due to excessive generation of austenite during heating of a soaking zone. Therefore, a level of internal oxidation may be reduced, and the size of the austenite in the soaking zone is excessively increased, resulting in softening of the material. In addition, a load on the annealing furnace is generated, which may cause problems such as shortening of equipment lifespan and an increase in process cost. Therefore, a temperature for controlling the dew point may be 900° C. or lower.

In this case, the dew point may be adjusted by injecting wet nitrogen ($N_2+H_2O$) containing water vapor into the annealing furnace.

Hydrogen concentration in annealing furnace: 5 to 10 vol %

The atmosphere in the annealing furnace is maintained as a reducing atmosphere by adding 5 to 10 vol % of hydrogen to nitrogen gas. When a hydrogen concentration in the annealing furnace is less than 5 vol %, oxides are excessively formed on the surface due to reduced reduction ability, which causes deterioration of the surface quality and plating adhesion, and the oxides formed on the surface inhibit a reaction between oxygen and carbon in the steel and the amount of decarburization is reduced, a degree of suppression of LME is reduced. When the hydrogen concentration is high, there is no particular problem. However, the hydrogen concentration is limited because there is an increase in cost and a risk of explosion in the furnace due to an increase in hydrogen concentration caused by an increase in amount of hydrogen gas used.

The steel sheet annealed by the process described above may be cooled through slow-cooling and rapid-cooling processes.

Temperature in slow-cooling zone during slow-cooling: 550 to 750° C.

A slow-cooling zone refers to a section in which a cooling rate is 3 to 5° C./s. When a temperature in the slow-cooling zone exceeds 750° C., soft ferrite is excessively formed during the slow-cooling, and thus, tensile strength may be reduced. On the contrary, when the temperature in the slow-cooling zone is lower than 550° C., bainite is excessively formed or martensite is formed, and thus, tensile strength may be excessively increased and an elongation may be reduced. Therefore, the temperature in the slow-cooling zone may be limited in the above range.

Temperature in rapid-cooling zone during rapid-cooling: 270 to 550° C.

A rapid-cooling zone refers to a section in which a cooling rate is 12 to 20° C./s. When a temperature in the rapid-cooling zone exceeds 550° C., martensite is formed below an appropriate level of amount during rapid-cooling, and thus, the tensile strength may be insufficient, and when the temperature in the rapid-cooling zone is lower than 270° C., martensite is excessively formed, and thus, the elongation may be insufficient.

The steel sheet annealed by such a process is immediately dipped in a plating bath to perform hot-dip galvanizing. When the steel sheet is cooled, a step of heating the steel sheet may be further included. The heating temperature needs to be higher than an entering temperature of the steel sheet to be described below, and may be higher than a temperature of the plating bath in some cases.

Entering temperature of steel sheet into plating bath: 420 to 500° C.

When the entering temperature of the steel sheet into the plating bath is too low, wettability in a contact interface between the steel sheet and liquid zinc is insufficiently secured, and thus, it needs to be maintained at 420° C. or higher. When the entering temperature of the steel sheet into the plating bath is too high, adhesion of the plating layer is reduced due to generation of a zeta phase, which is an Fe—Zn alloy phase, at the interface caused by an excessive reaction between the steel sheet and the liquid zinc, and an elution amount of an Fe element in the steel sheet is excessive in the plating bath, which causes generation of dross in the plating bath. Therefore, the entering temperature of the steel sheet may be limited to 500° C. or lower.

Al concentration in plating bath: 0.10 to 0.25%

An Al concentration in the plating bath needs to be appropriately maintained in order to secure wettability of the plating layer and fluidity in the plating bath. In order to maintain the formation of dross in the plating bath to an appropriate level and to secure plating surface quality and performance, in the case of GA, the Al concentration needs to be controlled to 0.10 to 0.15%, and in the case of GI, the Al concentration needs to be controlled to 0.2 to 0.25%.

The hot-dip galvanized steel sheet plated by the process described above may be subjected to an galvannealing heat treatment process, if necessary. Preferred conditions of the galvannealing heat treatment are as follows.

Galvannealing (GA) temperature: 480 to 560° C.

When a galvannealing temperature is lower than 480° C., the degree of alloying is insufficient due to a small amount of Fe diffused, which may cause deterioration of physical properties of plating, and when the galvannealing temperature exceeds 560° C., powdering may occur due to excessive alloying, and the material may be deteriorated due to transformation of retained austenite into ferrite. Thus, the galvannealing temperature is set to be within the above range.

MODE FOR INVENTION

Hereinafter, the present disclosure will be described in more detail with reference to Examples. However, it should be noted that the following Examples are only intended to further illustrate the present disclosure and are not intended to limit the scope of the present disclosure. This is because the scope of the present disclosure is determined by matters described in the claims and matters reasonably inferred therefrom.

Examples

A steel slab having the composition shown in Table 1 (The remaining components not listed in the table are Fe and inevitable impurities. In addition, in the table, B and N are represented in ppm unit, and the remaining components are represented in wt % unit) was heated to 1,230° C., the heated steel slab was hot-rolled by setting finishing rolling start and end temperatures to 980° C. and 895° C., respectively, and then, an edge portion of a hot-rolled coil was heated. Thereafter, cold-rolling was performed, pickling was performed with a 19.2 vol % hydrochloric acid solution, and then, cold-rolling was performed. The obtained cold-rolled steel sheet was annealed in an annealing furnace, and the annealed steel sheet was subjected to slow-cooling at 4.2° C./s in a slow-cooling zone at 620° C. and then subjected to rapid-cooling at 17° C./s in a rapid-cooling zone at 315° C., thereby obtaining an annealed steel sheet. Thereafter, the obtained steel sheet was heated to 470° C., GA was dipped in a plating bath containing 0.13% of Al, GI was dipped in a zinc-based plating bath containing 0.24 wt % of Al at 456° C., and then, hot-dip galvanizing was performed. The obtained hot-dip galvanized steel sheet was subjected to a galvannealing (GA) heat treatment at 520° C., according to demand, to finally obtain a hot-dip galvannealed (GA) steel sheet.

In all Examples, an entering temperature of the steel sheet entering into the hot-dip galvanizing bath was set to 475° C. Other conditions for each Example are as shown in Table 2.

TABLE 1

| Steel type | C | Si | Mn | S—Al | Cr | Mo | B | Nb | Ti | Sb | Sn | Bi |
|---|---|---|---|---|---|---|---|---|---|---|---|---|
| B | 0.204 | 1.542 | 2.32 | 0.0017 | 0 | 0 | 7 | 0 | 0.018 | 0 | 0.012 | 0 |
| D | 0.172 | 1.485 | 2.08 | 0.0014 | 0.124 | 0 | 9 | 0.021 | 0.014 | 0.021 | 0 | 0 |
| E | 0.184 | 1.121 | 2.234 | 0.0012 | 0.14 | 0.012 | 5 | 0.013 | 0.027 | 0.014 | 0 | 0 |
| F | 0.173 | 1.497 | 2.57 | 0.0012 | 0 | 0 | 11 | 0.014 | 0.021 | 0.017 | 0 | 0 |

TABLE 2

| Steel type | Classification | Hot-roll coiling temperature (° C.) | Edge portion heating temperature (° C.) | Edge portion heating time (hr) | Pickling speed (mm) | Sheet-passing annealing furnace (mpm) | Temperature in soaking zone (° C.) | Dew point in soaking zone (° C.) | Hydrogen concentration in annealing furnace (vol %) |
|---|---|---|---|---|---|---|---|---|---|
| B | Comparative Example 1 | 706 | 698 | 10 | 145 | 79 | 821 | 8 | 5 |
| B | Inventive Example 1 | 621 | 631 | 15 | 214 | 86 | 793 | −5 | 6 |
| B | Comparative Example 2 | 504 | 654 | 19 | 214 | 87 | 804 | 17 | 7 |
| D | Inventive Example 2 | 630 | 624 | 12 | 212 | 101 | 811 | 10 | 6 |
| B | Comparative Example 3 | 621 | 612 | 12 | 189 | 109 | 817 | 14 | 2 |
| F | Inventive Example 3 | 624 | 708 | 10 | 210 | 75 | 824 | 17 | 5 |
| F | Inventive Example 4 | 611 | 652 | 14 | 209 | 75 | 795 | 9 | 6 |
| D | Comparative Example 4 | 624 | 624 | 12 | 214 | 151 | 817 | 11 | 5 |
| E | Comparative Example 5 | 714 | 624 | 3 | 214 | 76 | 811 | 7 | 7 |
| D | Comparative Example 6 | 614 | 635 | 11 | 208 | 114 | 795 | −21 | 6 |
| E | Inventive Example 5 | 617 | 741 | 12 | 211 | 45 | 842 | 10 | 5 |
| D | Comparative Example 7 | 852 | 625 | 11 | 210 | 84 | 831 | 11 | 8 |
| E | Comparative Example 8 | 719 | 575 | 7 | 232 | 79 | 812 | 9 | 8 |
| D | Comparative Example 10 | 619 | 678 | 10 | 241 | 87 | 912 | 21 | 6 |
| E | Inventive Example 6 | 632 | 710 | 10 | 214 | 65 | 810 | 14 | 5 |
| E | Inventive Example 7 | 607 | 714 | 12 | 214 | 74 | 811 | 8 | 6 |
| B | Comparative Example 11 | 617 | 635 | 11 | 223 | 27 | 832 | 15 | 5 |
| E | Comparative Example 12 | 624 | 624 | 12 | 231 | 94 | 642 | 21 | 6 |
| B | Comparative Example 13 | 704 | 741 | 26 | 217 | 74 | 807 | 5 | 7 |
| B | Inventive Example 8 | 594 | 650 | 17 | 201 | 78 | 854 | 17 | 5 |
| F | Comparative Example 14 | 705 | 611 | 11 | 267 | 75 | 812 | 6 | 7 |
| D | Inventive Example 9 | 602 | 720 | 12 | 214 | 76 | 795 | 12 | 5 |
| F | Comparative Example 15 | 721 | 821 | 10 | 225 | 76 | 817 | 10 | 8 |
| B | Inventive Example 10 | 632 | 724 | 11 | 185 | 76 | 817 | 11 | 5 |
| F | Comparative Example 18 | 651 | 613 | 10 | 214 | 105 | 842 | 41 | 6 |

The properties of the hot-dip galvanized steel sheets manufactured by the above-described process were measured. The results of observing whether or not liquid metal embrittlement (LME) occurs during spot welding are shown in Table 3. The spot welding was performed along each cut edge obtained by cutting the steel sheet in a width direction. A spot welding current was applied twice and a hold time of 1 cycle was maintained after applying the current. The spot welding was performed with materials consisting of two types and three layers. The spot welding was performed by laminating in the order of evaluation material-evaluation material-GA 980 DP 1.4 t material (having a composition of 0.12 wt % of C, 0.1 wt % of Si, and 2.2 wt % of Mn). In the spot welding, a new electrode was used to weld a soft material 15 times, the electrode was abraded, and then, an upper limit current at which expulsion occurred was measured with a spot welding target material. After measuring the upper limit current, spot welding was performed 8 times for each welding current at a current lower than the upper limit current by 0.5 and 1.0 kA, a cross-sectional surface of the spot weld was precisely processed by electric discharge processing and was epoxy-mounted and ground, and a length of a crack was measured with an optical microscope. In the observation with the optical microscope, the magnification was set to be 100 times, and when no crack was observed at the magnification, it was determined that liquid metal embrittlement did not occur, and when a crack was observed, a length thereof was measured using image analysis software. It was determined as "good" when a length of a B-type crack generated at a shoulder portion of the spot weld was 100 µm or less, and was determined as "good" when no C-type crack was observed.

As illustrated in FIG. 1, as for a ratio (a/b) of a hardness of a surface layer portion (a) to a hardness of an internal portion (b) of the steel sheet, the hardness of each region may be an average value of values measured at equal intervals in a depth direction. In an exemplary embodiment in the present disclosure, a nano-indentation Vickers hardness of a region from the surface distant from the edge of the steel sheet by 1 mm to a depth of 5 to 100 µm was measured by applying a load of 5 g at intervals of 5 µm, and average values of measured hardness values at points corresponding to the depths of the surface layer portion and the internal region were defined as the hardness of the surface layer portion (a) and the hardness of the internal portion (b), respectively, and the ratio thereof was used as a value of the ratio (a/b).

Tensile strength was measured by a tensile test by preparing a sample of the JIS-5 standard taken in a C direction. A degree of alloying and a coating weight were measured using a wet dissolution method using a hydrochloric acid solution. As for sealer adhesion, an adhesive D-type for a structure for a vehicle adhered to the plating surface and the steel sheet was bent to 90 degrees, and whether or not plating was fallen off was confirmed. As for the powdering, a plating material was bent to 90 degrees, a tape adhered to the bent area and peeled off, and how many mm of a matter fallen off from a plating layer was on the tape was observed. It was determined as "defective" when the length of the plating layer peeled off from the tape exceeded 10 mm. As for flaking, the sample was processed into a "U" shape, and whether or not the plating layer was fallen off from the processed portion was observed. The GI steel sheet was subjected to a sealer bending test (SBT) to check whether the plating layer was peeled off and attached to a surface from which a sealer was removed when an adhesive for a structure of a vehicle was attached to the surface of the steel sheet and the steel sheet was bent to 90 degrees. The surface quality was observed by visually observing whether or not defects such as non-plating occurred in the steel sheet, and it was determined as "defective" when defects such as non-plating was visually observed.

TABLE 3

| Classification | Hardness ratio (a/b) (%) | Tensile strength (MPa) | Plating type | Coating weight (wt %) | Surface quality | Powdering (mm) | Flaking | SBT | LME occurrence B-type length (µm) | LME occurrence C-type length (µm) |
|---|---|---|---|---|---|---|---|---|---|---|
| Comparative Example 1 | 98 | 1,184 | GA | 46 | Good | 4 | Peeled off | — | 24 | 112 |
| Inventive Example 1 | 81 | 1,241 | GA | 49 | Good | 4 | Good | — | 45 | ND |
| Comparative Example 2 | 96 | 1,187 | GA | 42 | Good | 1 | Good | — | 21 | 321 |
| Inventive Example 2 | 91 | 1,045 | GA | 45 | Good | 2 | Good | — | ND | ND |
| Comparative Example 3 | 98 | 1,196 | GI | 12 | Defective | — | — | Peeled off | ND | 452 |
| Inventive Example 3 | 91 | 1,034 | GI | 59 | Good | 2 | — | Good | ND | ND |
| Inventive Example 4 | 75 | 978 | GA | 48 | Good | 1 | Good | — | 65 | ND |
| Comparative Example 4 | 96 | 784 | GI | 57 | Defective | — | — | Good | 45 | 166 |
| Comparative Example 5 | 96 | 1,014 | GA | 47 | Good | 2 | Good | — | 96 | 141 |
| Comparative Example 6 | 97 | 1,025 | GI | 46 | Defective | — | — | Peeled off | 24 | 245 |
| Inventive Example 5 | 84 | 1,027 | GA | 42 | Good | 4 | Good | — | 23 | ND |
| Comparative Example 7 | 90 | 754 | GA | 43 | Defective | 11 | Peeled off | — | ND | ND |
| Comparative Example 8 | 97 | 995 | GA | 44 | Good | 2 | Good | — | 65 | 548 |
| Comparative Example 10 | 96 | 754 | GA | 47 | Good | 1 | Good | — | 36 | 245 |
| Inventive Example 6 | 92 | 1,021 | GA | 43 | Good | 1 | Good | — | 14 | ND |
| Inventive Example 7 | 85 | 1,029 | GA | 41 | Good | 0 | Good | — | ND | ND |
| Comparative Example 11 | 84 | 788 | GA | 49 | Good | 2 | Good | — | 35 | ND |
| Comparative Example 12 | 97 | 742 | GA | 46 | Good | 0 | Good | — | 45 | 287 |
| Comparative Example 13 | 91 | 745 | GA | 46 | Defective | 12 | Good | — | 75 | ND |

TABLE 3-continued

| Classification | Hardness ratio (a/b) (%) | Tensile strength (MPa) | Plating type | Coating weight (wt %) | Surface quality | Powdering (mm) | Flaking | SBT | LME occurrence B-type length (μm) | C-type length (μm) |
|---|---|---|---|---|---|---|---|---|---|---|
| Inventive Example 8 | 84 | 1,242 | GA | 47 | Good | 2 | Good | — | ND | ND |
| Comparative Example 14 | 85 | 984 | GA | 48 | Defective | 13 | Good | — | 15 | ND |
| Inventive Example 9 | 84 | 1,174 | GA | 42 | Good | 0 | Good | — | 45 | ND |
| Comparative Example 15 | 92 | 741 | GA | 48 | Defective | 13 | Good | — | 54 | ND |
| Inventive Example 10 | 82 | 1,212 | GI | 42 | Good | 5 | Good | — | 14 | ND |
| Comparative Example 18 | 98 | 774 | GI | 47 | Defective | — | — | Peeled off | 54 | 45 |

In Inventive Examples 1, 2, 3, 4, 5, 6, 7, 8, 9, and 10, the steel composition and the manufacturing conditions satisfied the conditions of the present disclosure, such that the tensile strength, the plating quality, the coating weight, and the spot welding LME crack length were also good.

In Comparative Examples 2 and 7, the coiling temperature in the hot-rolling process did not satisfy the range suggested by the present disclosure. In Comparative Example 2, the hot-roll coiling temperature was lower than the range suggested by the present disclosure, and the amount of decarburization generated in the hot-rolling was insufficient, such that the ratio (a/b) of the hardness of the surface layer portion (a) to the hardness of the internal portion (b) of the steel sheet was 95% (0.95) or more, which did not satisfy the LME crack standard. In Comparative Example 7, since the steel sheet was manufactured at a temperature higher than the hot-roll coiling temperature suggested by the present disclosure, the amount of decarburization generated in the hot-rolling was sufficient, and thus, LME characteristics were good, but the scale was not completely removed during the pickling due to generation of excessively formed hot-rolled scale, plating peeling occurred in the flaking evaluation due to defective surface quality caused by occurrence of non-plating, and the powdering properties were defective due to non-uniformity of alloying. The hot-rolled material was softened due to an excessively high hot-roll coiling temperature and the tensile strength was deteriorated because the softening was not recovered even after annealing.

In Comparative Example 15, the heating temperature of the edge portion exceeded the range suggested by the present disclosure, and thus, excessive oxidation occurred at the edge portion during the heat treatment process, such that the scale present in the surface formed red hematite, and the thickness was excessively increased. In the pickling process after the hot-rolling, the edge portion was excessively pickled and the surface roughness was increased, such that the surface shape was non-uniform and a color non-uniformity defect in which the color of the surface was different from that of the central portion occurred after plating, and the powdering properties were defective due to non-uniformity of alloying. In the heat treatment process, excessive decarburization occurred, and thus, the reduction ratio of the hardness satisfied the standard, such that LME satisfied the standard, but the material property was deteriorated.

In Comparative Example 8, the heating temperature of the edge portion was controlled to be lower than the range of the present disclosure. As a result, the hardness ratio (a/b) was insufficiently reduced during the hot-rolling, and thus, the LME crack evaluation standard during spot welding was not satisfied.

In Comparative Example 13, the heating temperature of the edge portion satisfied the range of the present disclosure, but the heating time exceeded, and thus, excessive oxidation occurred at the edge portion during the heat treatment process, such that the scale present in the surface was formed as red hematite, and the penetration thickness of the scale was also excessive. After the hot-rolling, in the pickling process, the edge portion was excessively pickled and the surface roughness was increased, such that the surface shape was non-uniform and a color non-uniformity defect in which the color of the surface was different from that of the central portion occurred after plating, and the powdering properties were defective due to non-uniformity of alloying.

In Comparative Example 5, the heating temperature of the edge portion satisfied the range of the present disclosure, but the heating time of the edge portion was lower than that of the range suggested by the present disclosure. As a result, a sufficient hot-rolled decarburized layer was not formed, and thus, the spot welding LME crack evaluation did not satisfy the standard, which was defective.

In Comparative Examples 1 to 14, the pickling speed did not satisfy the range suggested by the present disclosure. In Comparative Example 1, since the steel sheet was manufactured at a pickling speed lower than the standard and the pickling time was excessively increased, the decarburized layer formed during the hot-rolling was dissolved and removed in an acid solution, such that the ratio (a/b) of the hardness of the surface layer portion (a) to the hardness of the internal portion (b) of the steel sheet was higher than the standard, resulting in generation of LME cracking. As the hot-rolled internal oxidation grain boundary was corroded by the acid solution, the grain boundary integrity was deteriorated and peeling occurred in the flaking test. In comparative Example 14, since the steel sheet was manufactured at a pickling speed higher than the standard, the hot-rolled scale was not completely removed and remained, such that the surface quality was deteriorated and the powdering properties were deteriorated due to non-uniformity of the degree of GA alloying.

In Comparative Example 10, the temperature in the soaking zone in the annealing furnace exceeded the range suggested by the present disclosure. As the annealing temperature was excessively increased, a sufficient internal oxidation amount was not obtained due to an increase in external oxidation amount, such that the ratio (a/b) of the hardness of the surface layer portion (a) to the hardness of the internal portion (b) of the steel sheet was 95% or more, and the LME crack did not satisfy the standard, and thus, the spot weldability was defective. In addition, austenite was excessively formed and grown in the soaking zone, such that material property did not satisfy the standard, which was defective.

In Comparative Example 12, the steel sheet was manufactured at a temperature in the soaking zone in the annealing furnace lower than the range suggested by the present disclosure. An oxidation reaction between water vapor and the steel sheet was insufficient due to a low annealing temperature, and the internal oxidation was insufficiently formed, and thus, the ratio (a/b) of the hardness of the surface layer portion (a) to the hardness of the internal portion (b) of the steel sheet was high. Therefore, the LME crack did not satisfy the standard, and thus, the spot weldability was defective. In addition, a desired microstructure was not formed due to insufficient recrystallization during annealing, and thus, the material property did not satisfy the standard, which was defective.

In Comparative Example 6, the dew point in the furnace during the annealing was lower than the range suggested by the present disclosure. Even when the internal oxide layer was sufficiently formed in the entire width during the hot-rolling heating process, the decarburized layer was insufficiently formed because the dew point was insufficiently high during the annealing process after the cold-rolling, such that the ratio (a/b) of the hardness of the surface layer portion (a) to the hardness of the internal portion (b) of the steel sheet was 95% or more, and as a result, the spot weld LME crack length did not satisfy the standard. In the case of the GI material, sufficient internal oxidation was not generated due to a low dew point, and the oxides were excessively formed on the surface, resulting in defective surface quality and occurrence of peeling in SBT.

In Comparative Example 18, the dew point range in the annealing furnace exceeded the range suggested by the present disclosure. The decarburization reaction was sufficiently performed due to an excessively high dew point, and thus, LME was satisfied, but the standard was not satisfied due to deterioration of the material property caused by the excessive internal oxidation, and the amount of oxides generated on the surface due to the excessive dew point was increased, resulting in occurrence of plating peeling as a result of SBT.

In Comparative Example 3, the hydrogen concentration in the annealing furnace was less than 5 vol %, which showed that the composition of the reducing atmosphere in the annealing furnace was insufficient. Non-plating occurred due to excessive oxides formed on the surface, and thus, the surface quality was deteriorated and plating peeling in SBT occurred. In addition, since physical contact between carbon and oxygen in the steel was difficult due to excessive oxides, a reduction in hardness of the surface layer portion was insufficient, such that the LME crack did not satisfy the standard.

In the cases of Comparative Examples 4 to 11, the sheet-passing speed in the annealing furnace was out of the range suggested by the present disclosure. In Comparative Example 4, the working was performed at a sheet-passing speed higher than the range suggested by the present disclosure. The decarburization level was insufficient because a sufficient time for reacting with wet nitrogen was not secured, and thus, the ratio (a/b) of the hardness of the surface layer portion (a) to the hardness of the internal portion (b) was 95% or more, such that the LME crack did not satisfy the standard, and the material property (tensile strength) was deteriorated because a sufficient recrystallization time was not secured in the annealing furnace. In Comparative Example 11, the steel sheet was manufactured at a sheet-passing speed lower than the range suggested by the present disclosure, a sufficient decarburized layer was secured in the annealing furnace, and thus, LME was satisfied, but the material property (tensile strength) was deteriorated due to excessive formation of a decarburized layer.

From the results of Examples, the advantageous effects of the present disclosure could be confirmed.

The invention claimed is:

1. A galvanized steel sheet comprising:
a base steel sheet; and
a zinc-based plating layer formed on a surface of the base steel sheet,
wherein the base steel sheet includes a surface layer portion and an internal portion,
wherein a ratio (a/b) of a Vickers hardness of the surface layer portion (a) to a Vickers hardness of the internal portion (b) of the base steel sheet is less than 0.95,
wherein during spot welding, a length of a B-type LME crack generated at a shoulder portion of the spot weld is 100 μm or less and a C-type LME crack is not observed,
wherein the galvanized steel sheet has a powdering property in which a length of the plating layer peeled off from the tape is 10 mm or less, and
wherein a peeling does not occur in a sealer bending test.

2. The galvanized steel sheet of claim 1, wherein a coating weight of the zinc-based plating layer is 30 to 70 g/m$^2$.

3. The galvanized steel sheet of claim 2, wherein the base steel sheet has a composition containing, by weight ratio, 0.05 to 1.5% of C, 2.0% or less of Si, 1.0 to 30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N.

4. The galvanized steel sheet of claim 3, wherein a thickness of the base steel sheet is 1.0 to 2.0 mm.

5. The galvanized steel sheet of claim 2, wherein the surface layer portion contains internal oxides containing at least one of Si, Mn, Al, and Fe.

6. The galvanized steel sheet of claim 1, wherein the base steel sheet has a composition containing, by weight ratio, 0.05 to 1.5% of C, 2.0% or less of Si, 1.0 to 30% of Mn, 3% or less of S—Al (acid-soluble aluminum), 2.5% or less of Cr, 1% or less of Mo, 0.005% or less of B, 0.2% or less of Nb, 0.2% or less of Ti, 0.2% or less of V, 0.1% or less of Sb+Sn+Bi, and 0.01% or less of N.

7. The galvanized steel sheet of claim 6, wherein a thickness of the base steel sheet is 1.0 to 2.0 mm.

8. The galvanized steel sheet of claim 1, wherein the surface layer portion contains internal oxides containing at least one of Si, Mn, Al, and Fe.

* * * * *